(12) United States Patent
Yeh

(10) Patent No.: US 7,117,746 B2
(45) Date of Patent: Oct. 10, 2006

(54) DIGITAL PRESSURE GAUGE

(76) Inventor: Michael Yeh, 12F, No. 189, Kang Chien Rd., Nei Hu, Taipei (TW)

( * ) Notice: Subject to any disclaimer, the term of this patent is extended or adjusted under 35 U.S.C. 154(b) by 0 days.

(21) Appl. No.: 09/927,384

(22) Filed: Aug. 13, 2001

(65) Prior Publication Data

US 2003/0029246 A1     Feb. 13, 2003

(51) Int. Cl.
*G01L 9/00*     (2006.01)
(52) U.S. Cl. .......... 73/717; 600/480; 600/485; 702/85
(58) Field of Classification Search ............. 73/755, 73/115, 116, 431, 728; 702/91, 130; 600/493, 600/481, 488, 490, 484, 485, 487, 513, 585; 128/900, 908
See application file for complete search history.

(56) References Cited

U.S. PATENT DOCUMENTS

| | | | | |
|---|---|---|---|---|
| 3,646,606 A * | 2/1972 | Buxton et al. | ............. | 600/483 |
| 3,857,399 A * | 12/1974 | Zacouto | ......................... | 607/9 |
| 3,996,928 A * | 12/1976 | Marx | ......................... | 600/484 |
| 4,263,918 A * | 4/1981 | Swearingen et al. | ........ | 600/494 |
| 4,320,767 A * | 3/1982 | Villa-Real | ................... | 128/680 |
| 4,397,317 A * | 8/1983 | Villa-Real | ................... | 600/493 |
| 5,238,001 A * | 8/1993 | Gallant et al. | ............. | 600/513 |
| 5,485,848 A * | 1/1996 | Jackson et al. | ............. | 600/485 |
| 5,875,413 A * | 2/1999 | Vinci | ......................... | 702/91 |
| 6,485,429 B1 * | 11/2002 | Forstner | ..................... | 600/494 |

* cited by examiner

*Primary Examiner*—Daniel J. Colilla
*Assistant Examiner*—Marissa Ferguson-Samreth
(74) *Attorney, Agent, or Firm*—Rosenberg, Klein & Lee

(57) ABSTRACT

A digital pressure gauge comprises a power supply, an input button unit, a pressure sensor, a display unit, a warning unit, and a control unit. The control unit counts the number of operations and/or operation duration of the digital pressure gauge and generates an alarm through the display unit and the warning unit when the counted number of operations and/or operation duration of the digital pressure gauge exceeds a threshold.

7 Claims, 3 Drawing Sheets

DIGITAL PRESSURE GAUGE

FIELD OF THE INVENTION

The present invention relates to a digital pressure gauge, especially to a digital pressure gauge with prompting and/or warning functions.

BACKGROUND OF THE INVENTION

According to the regulation of U.S. code for standard pressure gauge (ANSI-SP9), the commercially available digital pressure gauge requires calibration after 10,000 times of operation to ensure the accuracy thereof.

Moreover, according to the regulation of European code (EN1060-3: 1997 code 9.2a), the digital pressure gauge requires calibration requires calibration after 2 years of operation to ensure the accuracy thereof.

However, the current digital pressure gauge is generally provided the function of detecting operation times and duration. Therefore, the users do not have sufficient information for their digital pressure gauges and the accuracy of the digital pressure gauge cannot be ensured.

SUMMARY OF THE INVENTION

It is the object of the present invention to provide a digital pressure gauge with prompting and/or warning functions, whereby the user is informed after the digital pressure gauge is used for an excessive number of times and/or duration that calibration is required.

To achieve this object, the present invention provides a digital pressure gauge, which comprises a power supply, an input button unit, a pressure sensor, a display unit, a warning unit, and a control unit. The control unit counts the number of operation times and/or operation duration of the digital pressure gauge and generates an alarm through the display unit and the warning unit when the counted number of operations and/or operation duration of the digital pressure gauge exceeds a threshold.

The various objects and advantages of the of the present invention will be more readily understood from the following detailed description when read in conjunction with the appended drawings, in which:

DETAILED DESCRIPTION OF THE INVENTION

Figure 1:
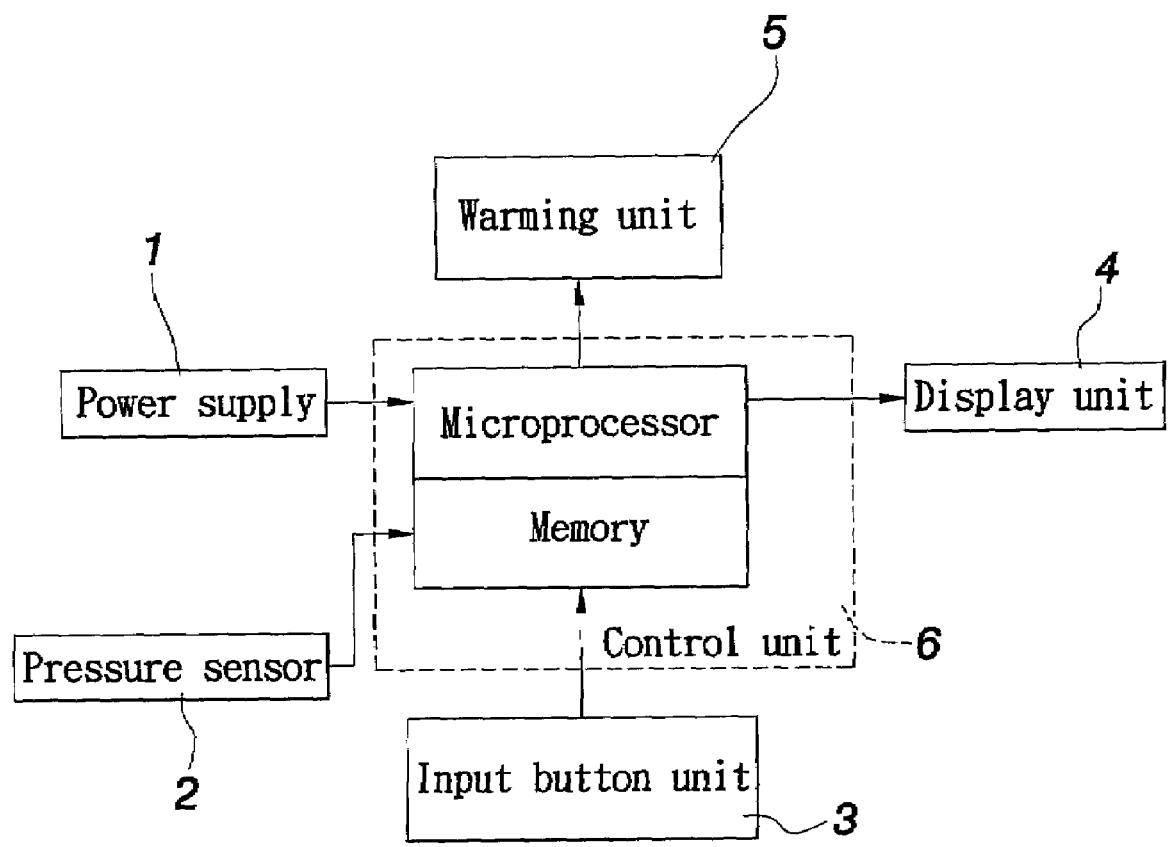
FIG. 1 shows a block diagram of the present invention.
Figure 2:
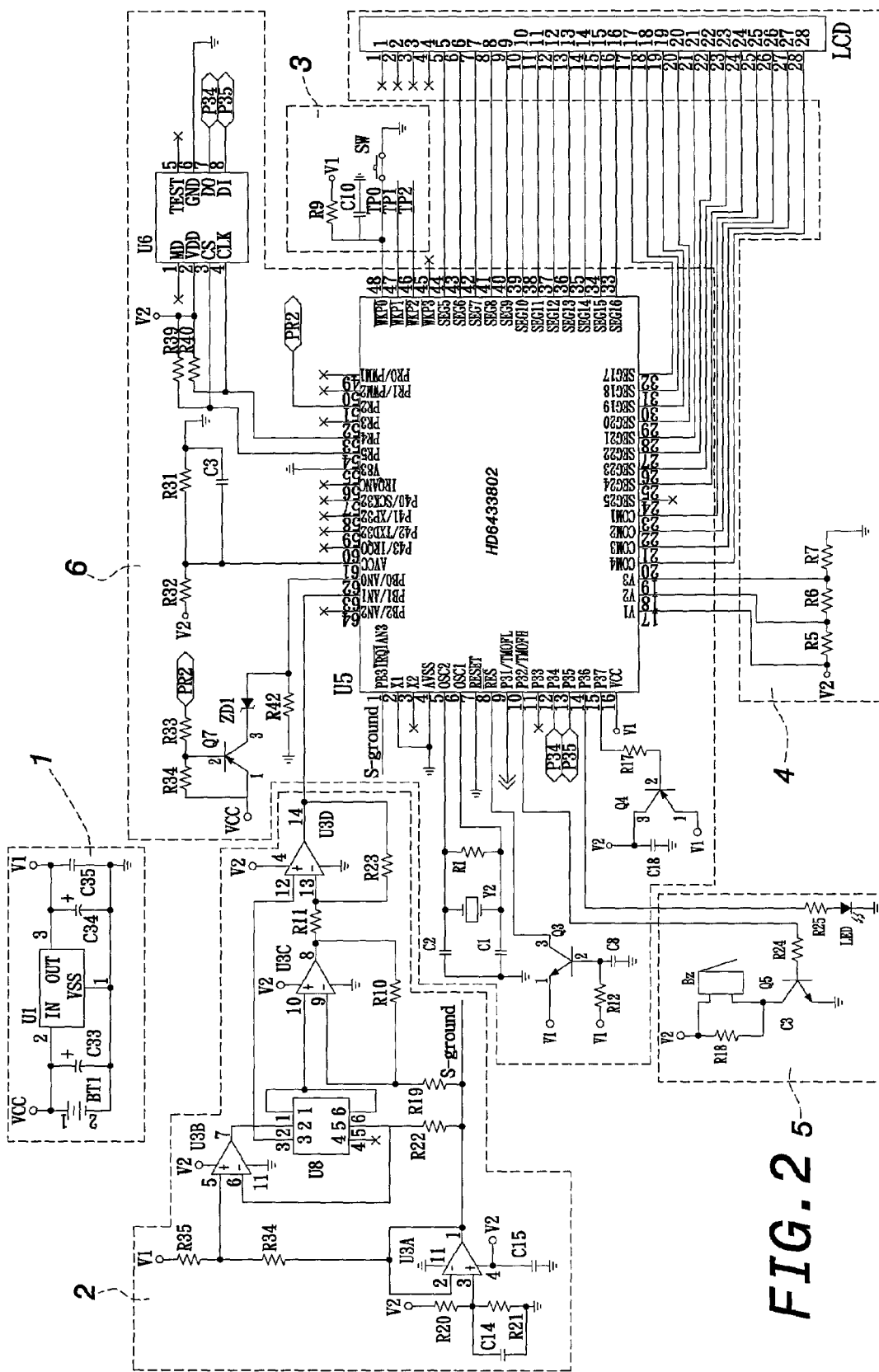
FIG. 2 shows a circuit diagram of the present invention.

With reference now to FIGS. 1 and 2, the present invention is intended to provide a digital pressure gauge with prompting and/or warning functions. The digital pressure gauge recording to a preferred embodiment of the present invention comprises a power supply 1, a pressure sensor 2, an input button unit 3, a display unit 4, a warning unit 5 and a control unit 6.

The power supply 1 is composed of a voltage-regulating IC U1, capacitors C33–C35 and a battery BT1 and is functioned to supply voltage to the components connected thereto.

The pressure sensor 2 is composed of ICs U3A–U3D, U8, resistors R22, R223, R34, R35 and capacitors C14, C15, etc. the pressure sensor 2 is used to generate a signal in response to a sensed pressure. In the preferred embodiment of the present invention, the pressure sensor 2 is used to sense blood pressure in a vessel.

The input button unit 3 is composed of a switch SW, a resistor R9 and a capacitor C10 and is used to operate the digital pressure gauge.

The display unit 4 is composed of a liquid crystal display (LCD), and resistors R5–R7, and is functions to display sensed pressure and warning messages.

The warning unit 5 is composed of a transistor Q5, resistors R18, R24, R25, beeper Bz and light emitting diode (LED) etc. The warning unit 5 is activated by the control unit 6 to enable the beeper Bz or the light emitting diode (LED).

The control unit 6 is composed of a microprocessor U5, a memory U6, transistors Q3, Q4, Q5 and Q7, and crystal Y2. The control unit 6 is connected to the power supply 1, the pressure sensor 2, the input button unit 3, the display unit 4, and the warning unit 5. Moreover, the control unit 6 counts the number of operations and/or operation duration of the digital pressure gauge and compares the counted number of operations and/or operation duration of the digital pressure gauge with respect to a threshold value. The threshold value is predetermined before the pressure gauge is old and can be modified by a user, such as a nurse.

When the control unit 6 detects that the number of operations and/or operation duration of the digital pressure gauge exceeds the predetermined threshold, the control unit 6 drives the beeper Bz of the warning unit 5, or drives the LED, or drives the LCD for warning the user.

Figure 3:
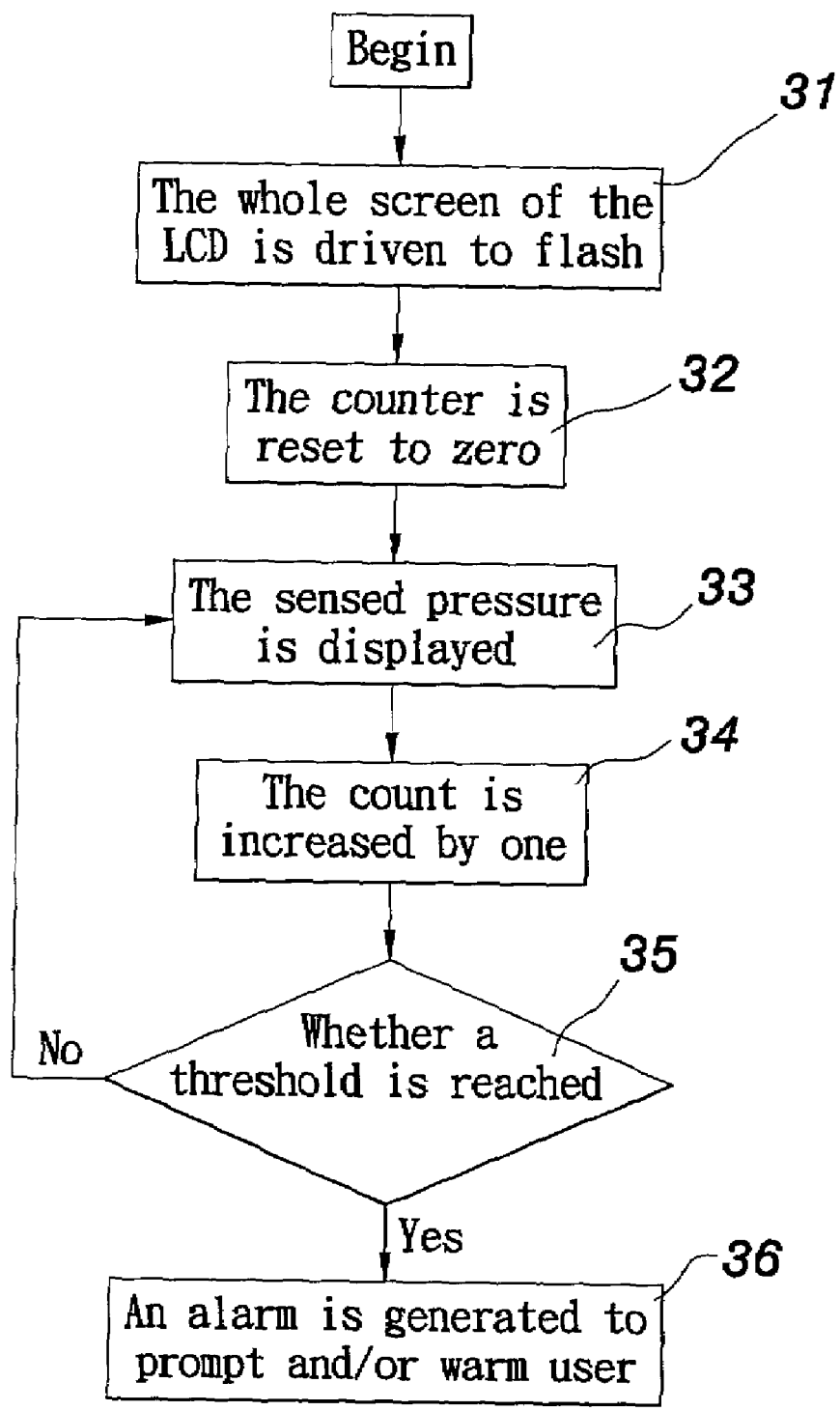
FIG. 3 shows a control flowchart of the digital pressure gauge after manufacture.

FIG. 3 shows the control flowchart of the digital pressure gauge after manufacture. At a step 31, the whole screen of the LCD is driven to flash. At a step 32, the counter is reset to zero. At a step 33, the sensed pressure is displayed. At a step 34, the count is increased by one. At a step 35, the control unit 6 determines whether a threshold is reached. If false, the procedure is returned to step 33, else, at a step 36 an alarm is generated to prompt and/or warn the user.

To sum up, the digital pressure gauge with prompting and/or warning functions according to the present invention can comply with the regulation codes in the U.S. or in Europe and an alarm is generated to prompt and/or warn the user that calibration is required. Therefore, the accuracy of the digital pressure gauge can be ensured.

Although the present invention has been described with reference to the preferred embodiment thereof, it will be understood that the invention is not limited to the details thereof. Various substitutions and modifications have been suggested in the foregoing description, and others will occur to those of ordinary skill in the art. For example, the threshold can be modified at a user's disposal. The warning unit can warn the user by sound, lighting, vibration or the combination thereof. Therefore, all such substitutions and modifications are intended to be embraced within the scope of the invention as defined in the appended claims.

I claim:

1. A digital pressure gauge comprising:
    a pressure sensor for use when measuring the blood pressure of a person;
    a control unit having an input connected to the pressure sensor for establishing a blood pressure value for the person, said control unit monitoring cumulative usage of the digital pressure gauge by automatically maintaining relative to a prior calibration at least one of a count parameter corresponding to a number of operations of the digital pressure gauge and an operational duration parameter corresponding to a usage period thereof, said control unit detecting that calibration of the digital pressure gauge is required if at least one of said count and duration parameters exceeds a predetermined threshold value corresponding thereto;

means, connected to the control unit, for visibly depicting the blood pressure value to an operator of the digital pressure gauge; and means, connected to the control unit, for warning the operator if the control unit detects that calibration of the digital pressure gauge is required.

2. The digital pressure gauge of claim 1, wherein the means for warning comprises means for emitting a signal selected from the group consisting of an audible signal, a light signal, a vibration signal, or a combination thereof.

3. The digital pressure gauge of claim 1, wherein each said predetermined threshold value is set during manufacture of tilt digital pressure gauge.

4. The digital pressure gauge of claim 1, wherein each said predetermined threshold value is set by the operator.

5. The digital pressure gauge of claim 1, further comprising a power supply coupled to the pressure sensor, the control unit, the means for warning, and the means for visibly depicting.

6. The digital pressure gauge of claim 1, further comprising an input button unit coupled to the control unit for operationally activating the digital pressure gauge.

7. The digital pressure gauge of claim 1, wherein the means for warning comprises means for emitting an audible warning signal.

* * * * *